United States Patent
Kondo

(10) Patent No.: US 8,756,356 B2
(45) Date of Patent: Jun. 17, 2014

(54) PIPE ARBITRATION USING AN ARBITRATION CIRCUIT TO SELECT A CONTROL CIRCUIT AMONG A PLURALITY OF CONTROL CIRCUITS AND BY UPDATING STATE INFORMATION WITH A DATA TRANSFER OF A PREDETERMINED SIZE

(71) Applicant: Renesas Electronics Corporation, Kanagawa (JP)

(72) Inventor: Kunihiro Kondo, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/853,500

(22) Filed: Mar. 29, 2013

(65) Prior Publication Data
US 2013/0219095 A1    Aug. 22, 2013

Related U.S. Application Data

(63) Continuation of application No. 12/902,855, filed on Oct. 12, 2010, now Pat. No. 8,423,693.

(30) Foreign Application Priority Data

Oct. 22, 2009    (JO) .................................. 2009-243245

(51) Int. Cl.
G06F 13/36    (2006.01)
G06F 13/38    (2006.01)

(52) U.S. Cl.
CPC .................................... *G06F 13/385* (2013.01)
USPC .......................................................... 710/113

(58) Field of Classification Search
CPC ....................................................... G06F 13/385
USPC ...................... 710/104–119, 308–310, 52–61
See application file for complete search history.

(56) References Cited

U.S. PATENT DOCUMENTS

| | | | |
|---|---|---|---|
| 6,119,195 A | 9/2000 | Ellis et al. | |
| 6,173,355 B1 | 1/2001 | Falik et al. | |
| 6,205,501 B1 | 3/2001 | Brief et al. | |
| 6,631,432 B1 | 10/2003 | Yamagishi | |
| 6,862,643 B2 | 3/2005 | Wu et al. | |
| 7,340,554 B2 | 3/2008 | Lee et al. | |
| 7,428,600 B2 | 9/2008 | Saito et al. | |

(Continued)

FOREIGN PATENT DOCUMENTS

| | | |
|---|---|---|
| JP | 2000-196607 A | 7/2000 |
| JP | 2003-316735 A | 11/2003 |
| JP | 2004-334417 A | 11/2004 |
| JP | 2004-355117 A | 12/2004 |
| JP | 2007-502476 (A) | 2/2007 |

*Primary Examiner* — Raymond Phan
(74) *Attorney, Agent, or Firm* — Foley & Lardner LLP

(57) ABSTRACT

Provided is an arbitration circuit included in a host controller that can be connected to a plurality of external devices via a plurality of pipe control circuits. The arbitration circuit includes an available state information storage unit that stores available state information. The available state information indicates an available state of the plurality of pipe control circuits and is updated by the pipe control circuit by a unit of data transfer of a predetermined communication size. The arbitration circuit further includes an arbitration unit that refers to the available state information storage unit, selects the arbitrary pipe control circuit from the available pipe control circuit, and allocates the selected pipe control circuit to the external device, while updating the available state information storage unit.

12 Claims, 6 Drawing Sheets

(56) References Cited

U.S. PATENT DOCUMENTS

| | | |
|---|---|---|
| 7,505,461 B2 | 3/2009 | Matsuda et al. |
| 7,895,386 B2 | 2/2011 | Chen et al. |
| 8,423,693 B2 * | 4/2013 | Kondo .......................... 710/113 |
| 2002/0199053 A1 | 12/2002 | Kondoh |
| 2004/0093454 A1 | 5/2004 | Teng |
| 2005/0002391 A1 | 1/2005 | Matsuda et al. |
| 2007/0233922 A1 | 10/2007 | Ismail et al. |
| 2009/0024777 A1 | 1/2009 | Hirotsu et al. |

* cited by examiner

PIPE ARBITRATION USING AN ARBITRATION CIRCUIT TO SELECT A CONTROL CIRCUIT AMONG A PLURALITY OF CONTROL CIRCUITS AND BY UPDATING STATE INFORMATION WITH A DATA TRANSFER OF A PREDETERMINED SIZE

CROSS-REFERENCE TO RELATED PATENT APPLICATIONS

Japan Priority Application 2009-243245, filed Oct. 22, 2009 including the specification, drawings, claims and abstract, is incorporated herein by reference in its entirety. This application is a Continuation of U.S. application Ser. No. 12/902,855, filed Oct. 12, 2010, incorporated herein by reference in its entirety.

BACKGROUND OF THE INVENTION

1. Field of the Invention

The present invention relates to a circuit and a method for pipe arbitration. In particular, the present invention relates to a circuit and a method for pipe arbitration for an embedded device.

2. Description of Related Art

USB (Universal Serial Bus) is one of serial bus standards for connecting various peripheral devices to a host device. EHCI (Enhanced Host Controller Interface) and OHCI (Open Host Controller Interface), which are common host controller standards of USB, are assumed to input and output data via a bus. FIG. 4 is a block diagram illustrating the concept of USB data transfer using the EHCI standard.

In the USB data transfer using the EHCI standard, control software creates a USB transaction list complied with the format defined by the EHCI standard for an endpoint in which a transfer request is generated. The control software writes the created USB transaction list to a system memory 21. Specifically, the control software creates the USB transaction list, and performs memory management of allocation and release to and from the system memory 21. A DMA (Direct Memory Access) master 23 reads the USB transaction list from the system memory 21 via a PCI bus. Then, a sequencer 22 performs the USB data transfer according to a transfer order defined by the USB transaction list which is read by the DMA master 23. The sequencer 22 is a processing unit that performs transfer control of data.

However, embedded devices, such as a digital still camera and printer, are not often mounted with high performance CPUs (Central Processing Unit) and PCI buses unlike PCs (Personal Computer). Therefore, embedded devices not mounted with the PCI buses cannot use a USB host controller complied with the standard. Further, the USB data transfer using the EHCI standard requires processes by software such as creation of the abovementioned USB transaction list, and thereby causing high load of processes.

Published Japanese Translation of PCT International Publication for Patent Application, No. 2007-502476 discloses a technique relating to a USB host controller used for the embedded device. This USB host controller enables a device without a PCI bus to perform the USB data transfer complied with the USB host controller standard. However, even this USB host controller cannot reduce the load of the control software to create the USB transaction list.

In order to reduce the complication of the process by the control software, there are products (for example, USB 2.0 controller R8A66597 produced by Renesas Electronics) mounted with a USB host controller that does not require the creation of the USB transaction list and enables USB transfers only by an I/O access process (such USB host controller is hereinafter referred to as a USB host controller for embedded devices).

FIG. 5 illustrates a configuration of the USB host controller for embedded devices. A USB host controller 40 includes a CPU interface control block 41, a USB transfer schedule control block 42, a USB pipe control circuit 43, a buffer memory for USB pipes 44, a USB interface control block 45, and a USB downstream port 46. The CPU interface control block 41 is an interface with a CPU that performs processes of software for controlling the USB host controller 40. The USB transfer schedule control block 42 determines a data transfer order of endpoints in an effective state according to conditions defined by the USB host controller standard. The USB pipe control circuit 43 controls virtual communication paths called pipes so as to issue USB data transfer, and perform buffering control of transfer data and control USB protocol. The buffer memory for USB pipes 44 is used for temporal data input and output at the time of data transfer by an external device connected to USB, a microcomputer including the USB host controller 40 or the like. The USB interface control block 45 is an interface that mediates processes generated between the USB pipe control circuit 43 and the USB downstream port 46. The USB downstream port 46 is a port for the USB host controller 40 to connect to the external device.

FIG. 6 is a block diagram illustrating an extraction of the part concerning USB control in the USB system mounted with the USB host controller 40 illustrated in FIG. 5. FIG. 6 illustrates the state in which a multi-card reader/writer 55 and a USB external hard disk 56 are physically connected to a USB host mounted system 50.

However, there are following problems in the USB data transfer process by the USB host controller for embedded devices. The USB data transfer process by the USB host controller for embedded devices is explained with reference to FIGS. 5 and 6.

The USB host controller 40 in FIG. 6 supports six pipe control circuits 431 to 436. In other words, the USB host controller 40 includes six pipe control circuits 431 to 436. In this example, the USB transfer schedule control block 42 selects an endpoint of the multi-card reader/writer 55 as a USB data transfer target endpoint. The multi-card reader/writer 55 shall transfer data using six pipes. When the multi-card reader/writer 55 is connected to the USB host controller 40, the multi-card reader/writer 55 occupies and uses the pipe control circuits 431 to 436. In this case, even if another USB external hard disk 56 is physically connected to the USB host mounted system 50, there is no available pipe control circuit in the USB host controller 40. Therefore, the USB external hard disk 56 cannot be in connection with the USB host controller 51 via the pipe.

Generally a USB host controller for embedded devices supports about ten pipe control circuits. A common USB memory and a USB hard disk transfer data using three pipe control circuits. Further, a sophisticated multifunction printer transfers data using about twelve pipe control circuits. Accordingly, in the USB host controller for embedded devices, only about three USB memories or USB hard disks in total can be in connection via pipes. Moreover, in the abovementioned USB host controller for embedded devices, there is a possibility that the sophisticated multifunction printer may not be in connection via the pipe.

SUMMARY OF THE INVENTION

The present inventor has found a problem that the abovementioned USB host controller for embedded devices limits the number of peripheral devices to be in connection via the pipes.

An exemplary aspect of the present invention is an arbitration circuit included in a host controller that can be connected to an external device via a plurality of pipe control circuits including an available state information storage unit that stores available state information, in which the available state information indicates an available state of the plurality of pipe control circuits and is updated by the pipe control circuit by a unit of data transfer of a predetermined communication size, and an arbitration unit that refers to the available state information storage unit, selects the arbitrary pipe control circuit from the available pipe control circuit, and allocates the selected pipe control circuit to the external device while updating the available state information storage unit.

In the present invention, the available information of the pipe control circuits is updated by each data transfer of the predetermined communication size. The arbitration circuit allocates the available pipe control circuits. This enables the pipe control circuits to be shared in data transfer with the plurality of external devices.

The present invention enables the pipe control circuits used in the data transfer to be shared with the plurality of external devices.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE PREFERRED EMBODIMENTS

First Exemplary Embodiment

Figure 1:
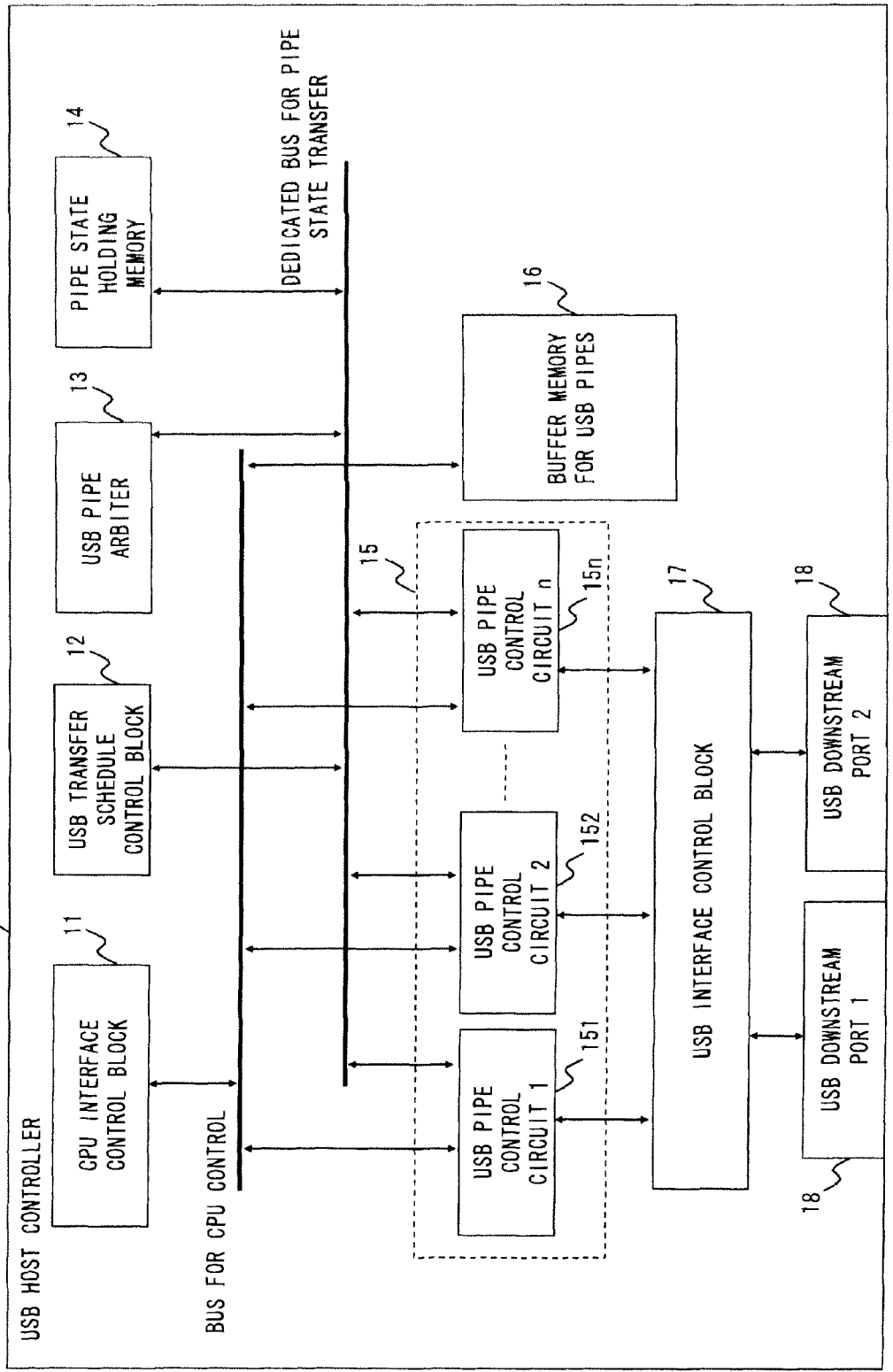
FIG. 1 is a block diagram of a USB host controller according to a first exemplary embodiment.

Hereinafter, an exemplary embodiment of the present invention is described with reference to the drawings. First, a basic configuration of a USB host controller according to this exemplary embodiment is explained with reference to FIG. 1. A USB host controller 10 includes a CPU (Central Processing Unit) interface control block 11, a USB transfer schedule control block 12, a USB pipe arbiter 13, a pipe state holding memory 14, a plurality of USB pipe control circuits 15 (151 to 15n), a buffer memory for USB pipes 16, a USB interface control block 17, and USB downstream ports 18.

The CPU interface control block 11 is an interface with CPU (not shown). The CPU executes software for controlling the USB host controller 10. The USB transfer schedule control block 12 is a processing unit that determines a data transfer order of effective endpoints according to conditions defined by the USB standard. Further, the USB transfer schedule control block 12 holds information of the endpoint of an external device connected to a device mounted with the USB host controller 10. The endpoint is also a buffer for data transfer. The information of the endpoint is at least the information for the USB host controller 10 to identify a data destination, and is composed of a device address, an endpoint number, and a transfer direction.

The USB pipe arbiter 13 holds the usage state of the USB pipe control circuit 15 described later. The USB pipe arbiter 13 operates as an arbitration circuit for arbitrating the USB pipe control circuit 15. The USB pipe arbiter 13 allocates the USB pipe control circuit 15 to the endpoints of each external device according to the usage state of the USB pipe control circuit 15. The detailed configuration and operation of the USB pipe arbiter 13 are explained later.

The pipe state holding memory 14 stores performance information of the external device physically connected to the USB host controller 10. The performance information of the external device here is information for the USB pipe control circuit 15 to use in USB data transfer with the external device to which data is transferred. For example, there is information of a USB transfer type, a transfer speed, and an interruption status of the external device. The performance information of the external device is stored when the external device is physically connected to the USB downstream port 18.

Moreover, the pipe state holding memory 14 holds process history information of the data transfer by the endpoint of each external device. The process history information is used by the USB pipe control circuit 15 to refer to the data transfer state of the endpoint so far, and resume the data transfer from an appropriate state. For example, the process history information includes information of whether or not an error occurred in the previous data transfer, a value of a data toggle sequence or the like. Note that the data toggle sequence is a value (Packet ID) included in a packet used for data transfer, and is sequence information for synchronization of packet transmission and reception between the USB host controller and the external device.

Note that although the pipe information holding memory 14 was explained as a storage unit that stores the performance information and the process history information of the external device, that information may be held in a different memory. Further, the pipe information holding memory 14 may be included in the USB pipe arbiter 13.

The USB pipe control circuit 15 (151 to 15n) is a circuit for controlling a pipe. To be specific, the USB pipe control circuit 15 (151 to 15n) issues USB transfer, perform buffering control of transfer data, and USB protocol control. By loading the information of the endpoint to which data is transferred, the USB pipe control circuit 15 can recognize the data destination. The number of circuits composing the USB pipe control circuit 15 is three, one each for during communication, next communication preparation, and standby. This enables data communication without rate-limiting factor. The number of circuits composing the USB pipe control circuit 15 is not limited to three but may be three or more, or less than three. When the data transfer of a predetermined communication size is completed, the USB pipe control circuit 15 updates the value held by a pipe state management register 132 described later. Specifically, when the data transfer of the predetermined communication size is completed, the USB pipe control circuit 15 writes to the pipe state management register 132 that the USB pipe control circuit has become available.

The buffer memory for USB pipes 16 is used for temporal data input and output at the time of data transfer by the external device connected to USE, a microcomputer including the USB host controller 10 or the like. A plurality of buffer memories for USB pipes 16 may be included.

The USB interface control block 17 is an interface that mediates processes generated between the USB pipe control circuit 15 and the USE downstream port 18. The USE downstream port 18 is a port for the USB host controller 10 to connect to the external device. The number of the USB downstream ports 18 differs depending on the device including the USB host controller 10. The number of the USE downstream ports 18 will be the same as the number of the external devices that can be physically connected to the device including the USB host controller 10.

Figure 2:
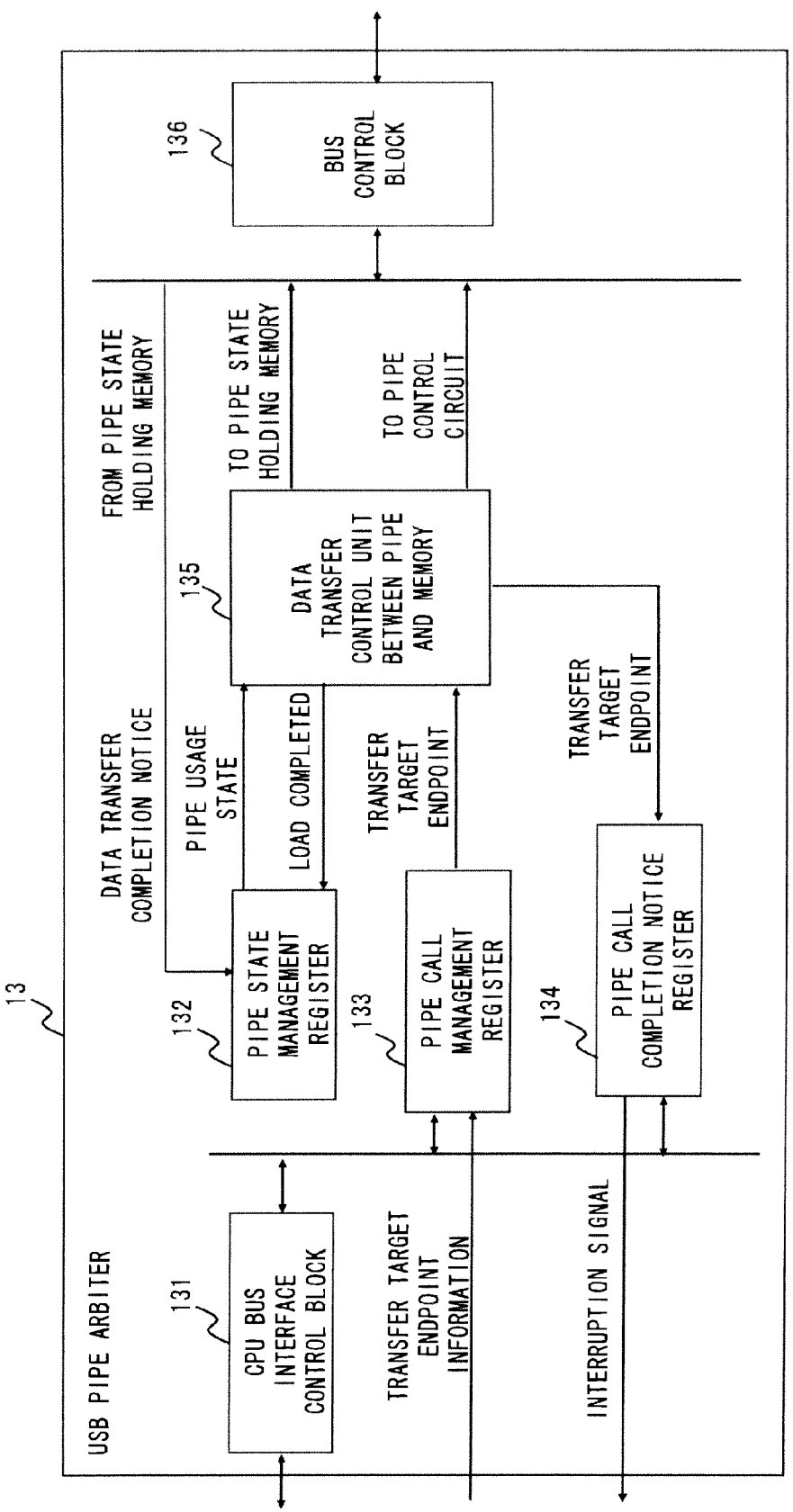
FIG. 2 is a block diagram of a USB pipe arbiter according to the first exemplary embodiment.

Next, a detailed configuration of the USB pipe arbiter 13 is explained with reference to FIG. 2. The USB pipe arbiter 13 includes a CPU bus interface control block 131, the pipe state management register 132, a pipe call management register 133, a pipe call completion notice register 134, a data transfer control unit between pipe and memory 135, and a bus control block 136.

The CPU bus interface control block 131 is a processing unit to be an interface with a bus for CPU control. The pipe state management register 132 stores the usage state of the USB pipe control circuit 15 (whether it is available or in use) in real time. In other words, the pipe state management register 132 is an available state information storage unit that stores the available state of the USB pipe control circuit 15. The value stored to the pipe state management register 132 is rewritten when the USB pipe control circuit 15 completes the data transfer of the predetermined data size.

The pipe call management register 133 specifies the information to identify the endpoint in which a data transfer request is generated. The information of the endpoint to which data is transferred is supplied to the pipe call management register 133 by the USB transfer schedule control block 12.

The pipe call completion notification register 134 indicates that the information of the endpoint which has issued the data transfer request is loaded to the USB pipe control circuit 15. When the data transfer control unit between pipe and memory 135 completes to allocate the USB pipe control circuit 15 to the endpoint, the information of the endpoint is written to the pipe call completion notification register 134.

The data transfer control unit between pipe and memory 135 functions as an arbitration unit to arbitrate the allocation of the USB pipe control circuit 15. More specifically, the data transfer control unit between pipe and memory 135 operates as described below.

The data transfer control unit between pipe and memory 135 periodically refers to the pipe call management register 133 to evaluate whether there is an endpoint to which data is transferred. If there is the endpoint to which data is transferred, the data transfer control unit between pipe and memory 135 refers to the pipe state management register 132 and identifies the available USB pipe control circuit 15. Moreover, the data transfer control unit between pipe and memory 135 obtains from the pipe state holding memory 14 device information of the external device corresponding to the endpoint to which data is transferred and the process history of the endpoint, and loads the obtained process history to the available USB pipe control circuit 15. When the loading process is completed, the data transfer control unit between pipe and memory 135 updates the value of the pipe state management register 132. Further, when the loading process is completed, the data transfer control unit between pipe and memory 135 writes to the pipe call completion notification register 134 the information of the endpoint which has completed the loading process, and also outputs an interruption signal to the CPU interface control block 11.

Next, the operation of the USB host controller 10 when the external device is physically connected to the USB downstream port 18 is explained. The USB host controller 10 obtains from the external device the endpoint information of the connected external device, which is the device address, the endpoint number, and the transfer direction. Then, the USB transfer schedule control block 12 holds the obtained endpoint information.

The USB host controller 10 further obtains the performance information of the connected external device, and stores the obtained information to the pipe state holding memory 14. At this time, the performance information of the external device and the information of the abovementioned endpoint is associated and stored. For example, the USB host controller 10 obtains the USB transfer type, the transfer speed, the interruption status information and the like of the physically connected external device to which data is transferred, and stores the obtained information to the pipe state holding memory 14.

Next, IN transfer, which is the process when the external device reads data from the device mounted with the USB host controller 10, is explained with reference to FIG. 2. Firstly, the USB transfer schedule control block 12 selects the endpoint to which data is transferred according to the USB standard from the endpoints capable of USB transfer. The USB transfer schedule control block 12 writes to the pipe call management register 133 in the USB pipe arbiter 13 the information of the selected endpoint, which is the device address, the endpoint information, and the transfer direction.

The data transfer control unit between pipe and memory 135 periodically refers to the pipe call management register 133 to evaluate whether there is an endpoint to which data is transferred. If there is the endpoint to which data is transferred, the data transfer control unit between pipe and memory 135 identifies an area of the pipe state holding memory 14 that should be accessed according to the endpoint information stored to the pipe call management register 133. The data transfer control unit between pipe and memory 135 refers to the identified area and obtains the device information of the external device corresponding to the endpoint to which data is transferred and the process history of the endpoint. Moreover, the data transfer control unit between pipe and memory 135 refers to the pipe state management register 132, and identifies the available USB pipe control circuit 15. In this example, the USB pipe control circuit 151 shall be available. Then, the data transfer control unit between pipe and memory 135 loads the device information and the process history information obtained from the pipe state holding memory 14 to the available USB pipe control circuit 151. For example, the control data transfer between pipe and memory 135 loads to the USB pipe control circuit 151 the USB transfer type, the transfer speed or the like of the external device as the device information of the endpoint. The data transfer control unit between pipe and memory 135 further loads to the USB pipe control circuit 151 that the previous data transfer of the endpoint is not erroneous, the value of the data toggle sequence is "1", and so on.

After the abovementioned loading process is completed, the data transfer control unit between pipe and memory 135 notifies the pipe state management register 132 of the completion of the loading process. Specifically, the data transfer control unit between pipe and memory 135 writes to the pipe state management register 132 that the USB pipe control circuit 151, which is allocated with the endpoint, is in use. Moreover, the data transfer control unit between pipe and memory 135 writes to the pipe call completion notification register 134 the information of the endpoint which has completed the loading process, and also outputs the interruption signal to the CPU interface control block 11. The USB pipe control circuit 151 loaded with the endpoint information issues a USB token, and starts the USB IN transfer. In this case, the USB pipe control circuit 151 uses the loaded device information and process history information to perform the USB IN transfer from an appropriate state.

Next, OUT transfer, which is the process when the device mounted with the USB host controller 10 writes data to the external device, is explained with reference to FIG. 2. When an OUT transfer request is generated, system software of the device mounted with the USB host controller 10 obtains the information of the endpoint of the data destination from the USB schedule control block 12 via the CPU interface control block 11. Then, the system software writes the endpoint information of the data destination to the pipe call management register 132.

The data transfer control unit between pipe and memory 135 periodically refers to the pipe call management register 133 to evaluate whether there is an endpoint to which data is transferred. The subsequent processes when there is the endpoint to which data is transferred are similar to the case of the IN transfer. To be specific, the data transfer control unit between pipe and memory 135 accesses the pipe state holding memory 14, selects the available USB pipe control circuit 15, and loads the device information and the process history information to the USB pipe control circuit 15. Then, the USB pipe control circuit 15 issues the USB token, and starts the USB OUT transfer.

Next, an operation of the USB host controller 10 when the IN or OUT transfer is completed is explained below. In this example, the completion of the IN or OUT transfer means the completion of transmission by a unit of packet used in data transmission. For example, when the data transfer of the predetermined communication size (for example 512 bytes) is completed, the USB pipe control circuit 151 updates the pipe state management register 132. More specifically, each of the USB pipe control circuit 15 writes to the pipe state management register 132 that the USB pipe control circuit 15 has become available by each data process of the predetermined communication size.

Further, when the data transfer of the predetermined communication size (for example, 512 bytes) is completed, the USB pipe control circuit 151 writes the process history of the endpoint of the data destination to the pipe state holding memory 14. For example, the USB pipe control circuit 151 writes to the pipe state holding memory 14 whether the data transfer with the endpoint is completed in an error, the value of the data toggle sequence, or the like.

Figure 3:
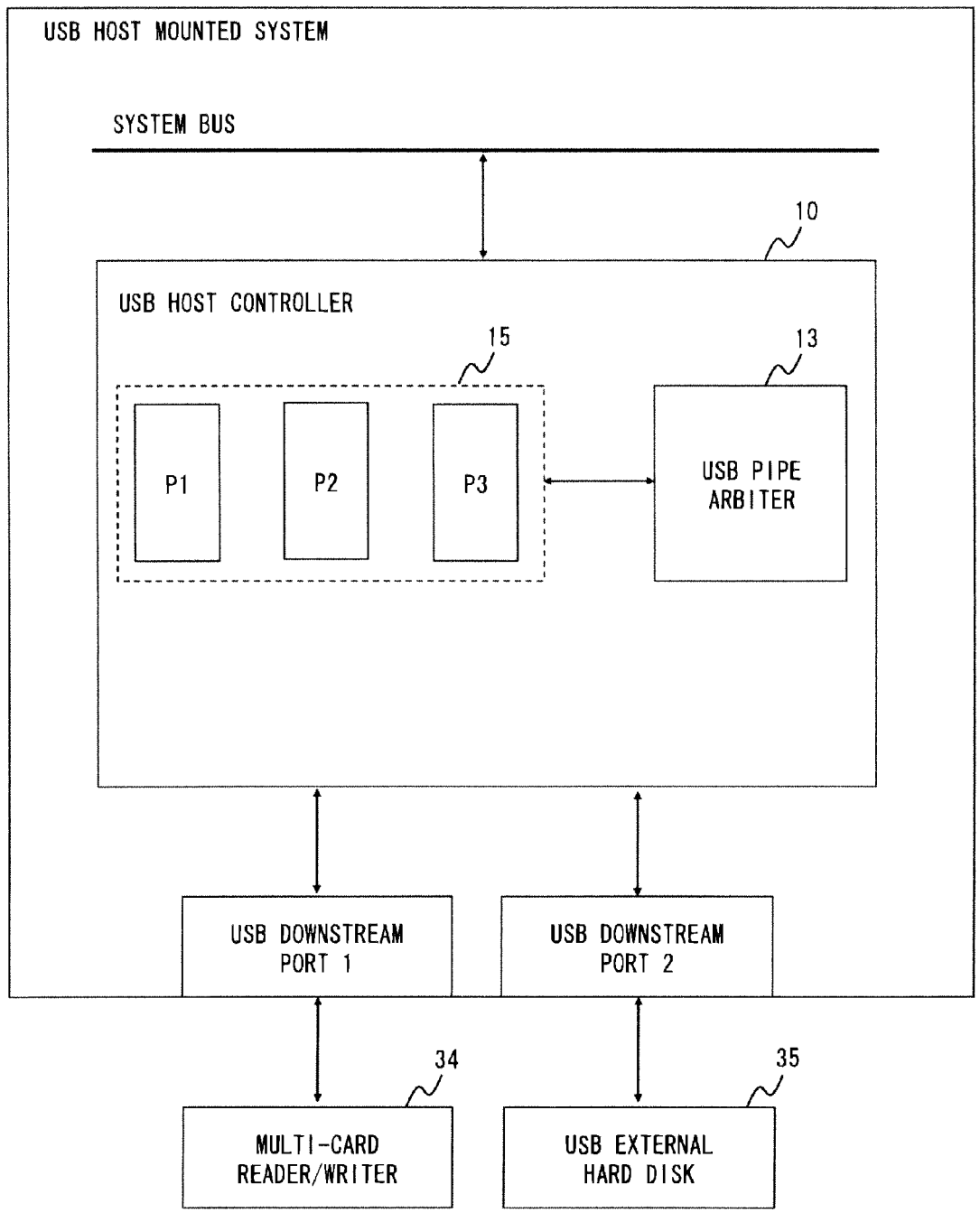
FIG. 3 illustrates a connection relationship of a device using the USB host controller according to the first exemplary embodiment.
Figure 4:
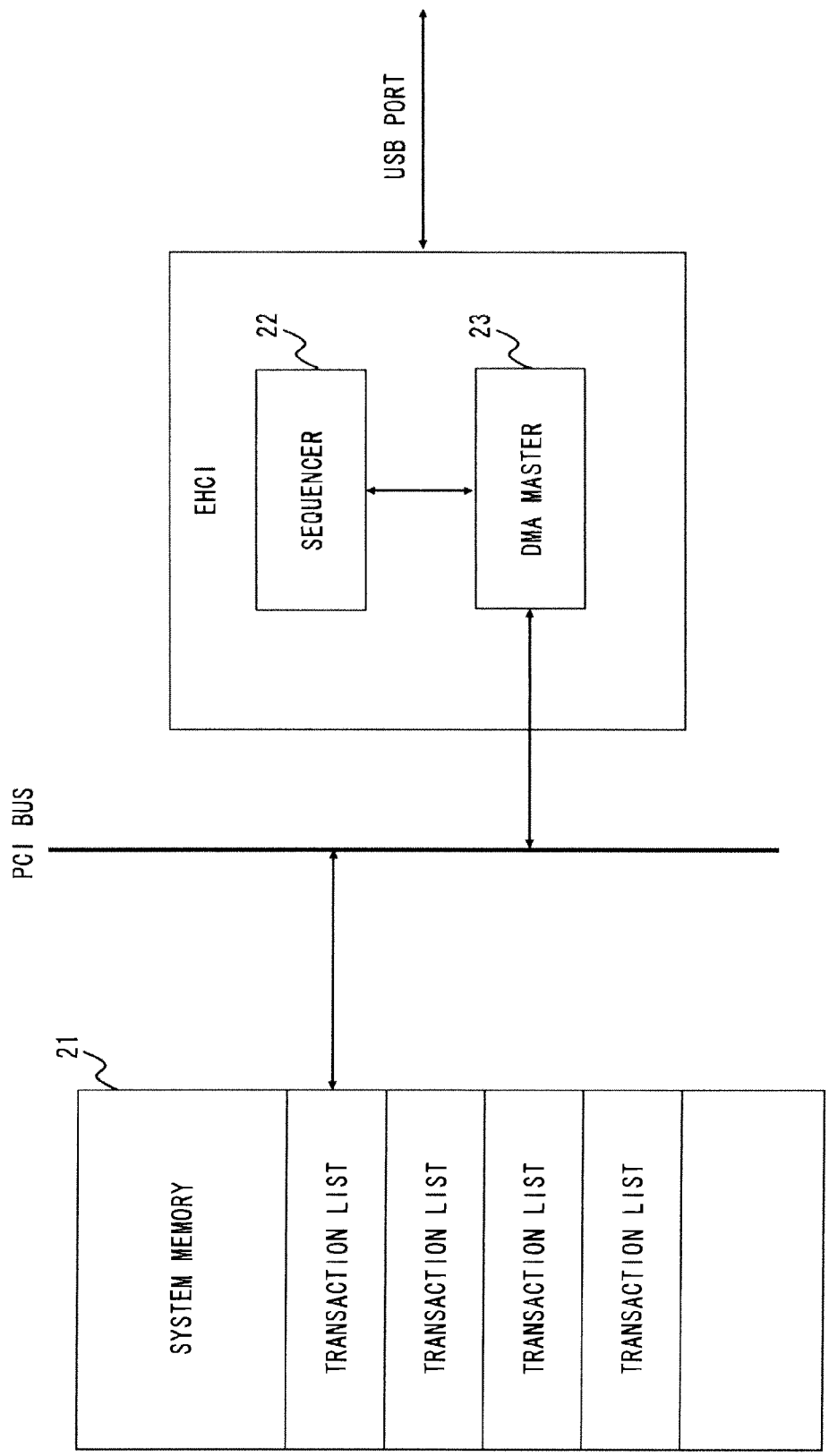
FIG. 4 is a conceptual diagram of USB data transfer using the EHCI standard according to a related art.
Figure 5:
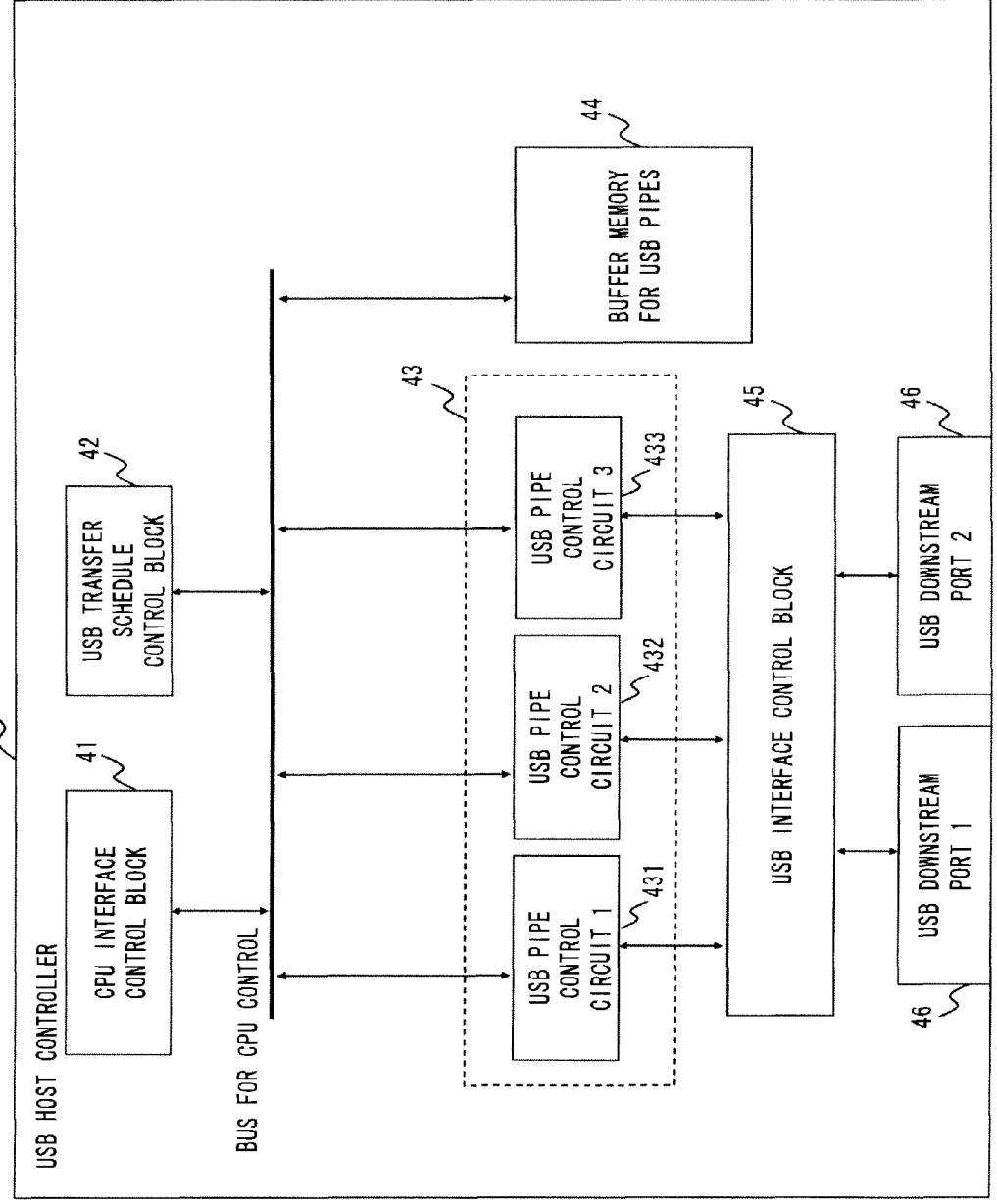
FIG. 5 is a block diagram of a USB host controller according to the related art.
Figure 6:
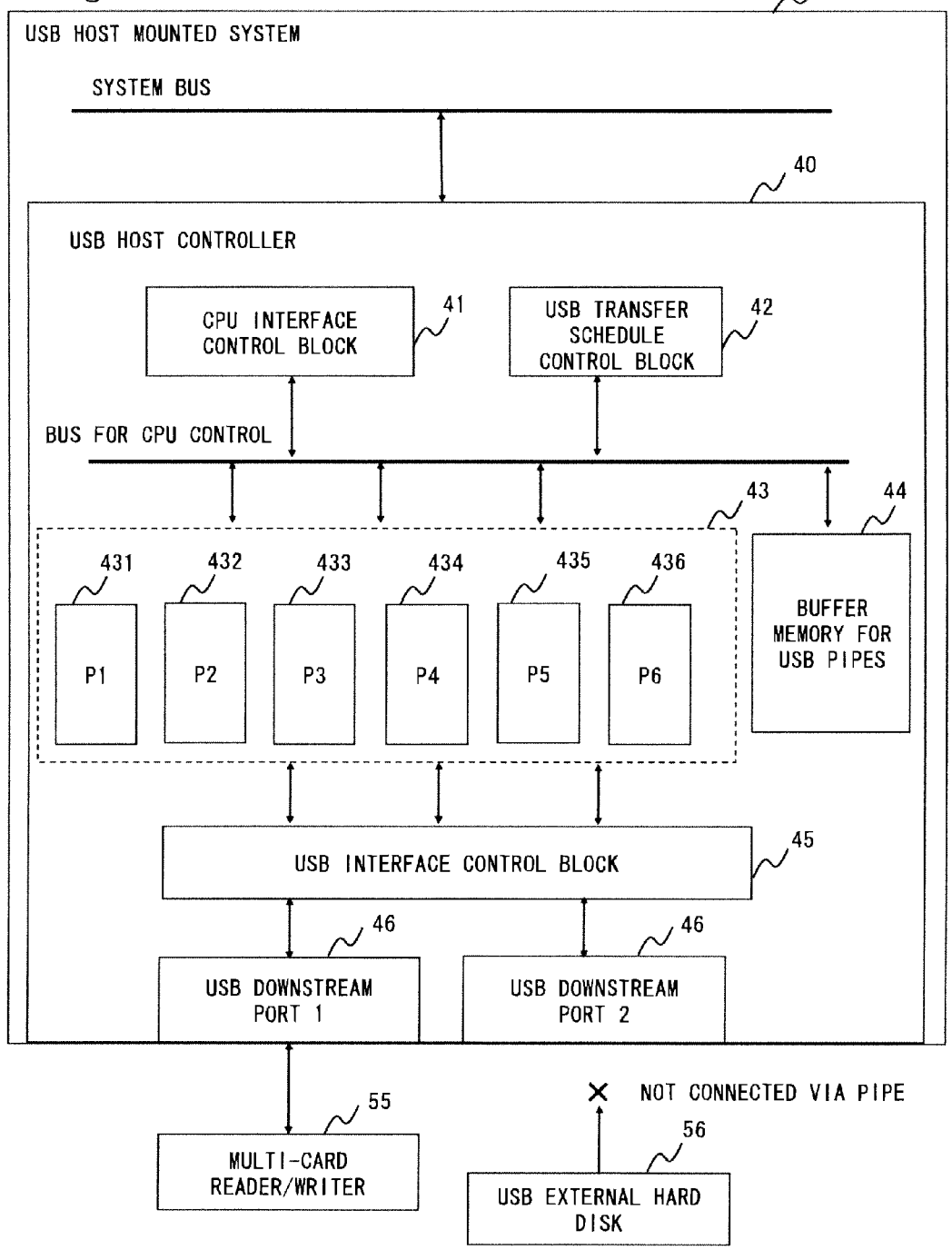
FIG. 6 illustrates a connection relationship of a device using the USB host controller according to the related art.

FIG. 3 illustrates a USB host mounted system incorporating the abovementioned USB host controller 10. A multi-card reader/writer 34 and a USB external hard disk 35 use the USB pipe control circuit 15 via the USB pipe arbiter 13. By the USB pipe arbiter 13 arbitrating the usage of the USB pipe control circuit 15, the USB pipe control circuit 15 can be shared.

Next, exemplary advantages by the host controller according to this exemplary embodiment are explained hereinafter. As mentioned above, the arbitration circuit is included in the host controller, and the available information of the pipe control circuit is rewritten by each data transfer of the predetermined communication size. By the arbitration circuit allocating the available pipe control circuit to the endpoint with the external device by each data transfer of the predetermined communication size, it is possible to share the pipe control circuits. Accordingly, the number of peripheral devices that can be connected is not limited even with a small number of pipe control circuits. In other words, this enables connections of many peripheral devices via pipes while keeping the circuit size small.

In the data transfer using the USB standard, according to the standard, at a maximum of 4064 endpoints included in 127 external devices and the device including the USB host controller can be in connection via pipes. In the host controller according to this exemplary embodiment, by sharing the pipe control circuits, it is possible to connect the same number of external devices as the upper limit of the standard via pipes.

In the host controller according to this exemplary embodiment, the process history information of each endpoint of the external device, which is physically connected, is stored to the pipe state holding memory. The pipe control circuit is notified of the process history information of the endpoint to which data is transferred before starting to transfer data. Accordingly, even if the data transfer target of the pipe control circuit changes by every predetermined communication size, it is possible to start the data transfer from an appropriate state.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A host controller comprising:
    a first port through which data communication is performed, wherein a first device is connected to the first port;
    a plurality of control circuits;
    a schedule control unit configured to output endpoint information of an external device to be connected;
    an arbitration circuit configured to, when an endpoint to which data is to be transmitted is included in the endpoint information, inform one of the plurality of control circuits of device information included in the endpoint information; and
    an informed control circuit configured to perform data communication with the first device through the first port based on the device information,
    wherein the informed control circuit is further configured to inform the arbitration circuit that a data transfer of a predetermined size has been finished by using a data transfer end notification in the data communication with the first device, and
    wherein the arbitration circuit is further configured to obtain the endpoint information again and to inform one of the plurality of control circuits of device information included in the endpoint information obtained again.

2. The host controller according to claim 1, wherein the schedule control unit is further configured to select endpoint information to be output according to a condition specified in a USB standard.

3. The host controller according to claim 1, wherein the arbitration circuit is further configured to inform the selected control circuit of device information of an external device to which data is to be transferred.

4. The host controller according to claim 2, wherein the schedule control unit is further configured to write a device address and information about a transfer direction included in the selected endpoint information into a register of the arbitration circuit.

5. The host controller according to claim 4, wherein the arbitration circuit is further configured to refer to the register at a regular interval and thereby determine whether or not there is an endpoint to which data is to be transmitted.

6. A host controller comprising:
an arbitration circuit;
a first port through which data communication is to be performed, wherein a first device is connected to the first port;
a second port through which data communication is to be performed, wherein a second device is connected to the second port; and
a plurality of control circuits,
wherein the arbitration circuit is configured to:
allocate one of the plurality of control circuits to the first port when data communication is performed with the first device; and
allocate the one of the plurality of control circuits to the second port when the data communication with the first device is stopped and data communication is performed with the second device.

7. The host controller according to claim 6, wherein the arbitration circuit is further configured to allocate the one of the plurality of control circuits to the first port when the data communication with the second device is stopped and data communication with the first device is resumed.

8. A method of controlling data communication, comprising:
performing, through a first port, data communication, wherein a first device is connected to the first port;
outputting, by a schedule control unit, endpoint information of an external device to be connected;
when an endpoint to which data is to be transmitted is included in the endpoint information, informing one of a plurality of control circuits, by an arbitration circuit, device information included in the endpoint information;
performing, by an informed control circuit, data communication with the first device through the first port based on the device information;
informing the arbitration circuit, by the informed control circuit, that a data transfer of predetermined size has been finished by using a data transfer end notification in the data communication with the first device; and
obtaining, by the arbitration circuit, the endpoint information again, and informing one of the plurality of control circuits of device information included in the endpoint information obtained again.

9. The method according to claim 8, further comprising:
selecting, by the schedule control unit, endpoint information to be output according to a condition specified in a USB standard.

10. The method according to claim 8, further comprising:
informing, by the arbitration circuit, the selected control circuit of device information of an external device to which data is to be transferred.

11. The method according to claim 9, further comprising:
writing, by the schedule control unit, a device address and information about a transfer direction included in the selected endpoint information into a register of the arbitration circuit.

12. The method according to claim 11, further comprising:
referring, by the arbitration circuit, to the register at a regular interval, thereby determining whether or not there is an endpoint to which data is to be transmitted.

* * * * *

UNITED STATES PATENT AND TRADEMARK OFFICE
CERTIFICATE OF CORRECTION

| | | |
|---|---|---|
| PATENT NO. | : 8,756,356 B2 | Page 1 of 1 |
| APPLICATION NO. | : 13/853500 | |
| DATED | : June 17, 2014 | |
| INVENTOR(S) | : Kunihiro Kondo | |

It is certified that error appears in the above-identified patent and that said Letters Patent is hereby corrected as shown below:

Title Page item (30) Foreign Application Priority Data should read:

Oct. 22, 2009 (JP)..........................2009-243245

Signed and Sealed this
Sixteenth Day of September, 2014

Michelle K. Lee
*Deputy Director of the United States Patent and Trademark Office*